(No Model.) 2 Sheets—Sheet 1.

W. G. MINOR.
WATER STILL AND WATER HEATING AND COOKING APPLIANCE.

No. 556,157. Patented Mar. 10, 1896.

Witnesses
Perry Kingman.
F. T. Johnson.

Inventor
Wallace G. Minor
by Hazard Townsend
his attys (No Model.) 2 Sheets—Sheet 2.

W. G. MINOR.
WATER STILL AND WATER HEATING AND COOKING APPLIANCE.

No. 556,157. Patented Mar. 10, 1896.

Witnesses
Perry Kingman.
F. T. Johnson.

Inventor
Wallace G. Minor
by Hazard Townsend
his Atty.

ANDREW B GRAHAM, PHOTO-LITHO, WASHINGTON, D.C.

UNITED STATES PATENT OFFICE.

WALLACE G. MINOR, OF LOS ANGELES, CALIFORNIA.

WATER-STILL AND WATER-HEATING AND COOKING APPLIANCE.

SPECIFICATION forming part of Letters Patent No. 556,157, dated March 10, 1896.

Application filed June 7, 1895. Serial No. 552,005. (No model.)

*To all whom it may concern:*

Be it known that I, WALLACE G. MINOR, a citizen of the United States, residing at Los Angeles, in the county of Los Angeles and State of California, have invented a new and useful Water-Still and Water-Heating and Cooking Appliance, of which the following is a specification.

One object of my invention is to provide a simple, cheap and effective appliance for distilling water to be used for drinking and other purposes.

Another object of my invention is to provide an appliance adapted for this purpose which is also adapted to be used as a cooking utensil when desired.

The accompanying drawings illustrate my invention.

Figure 1:
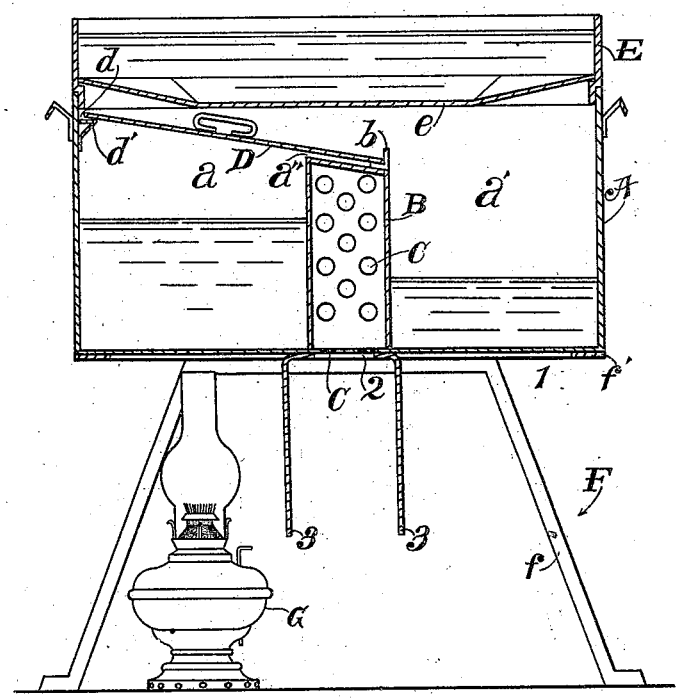
Figure 2:
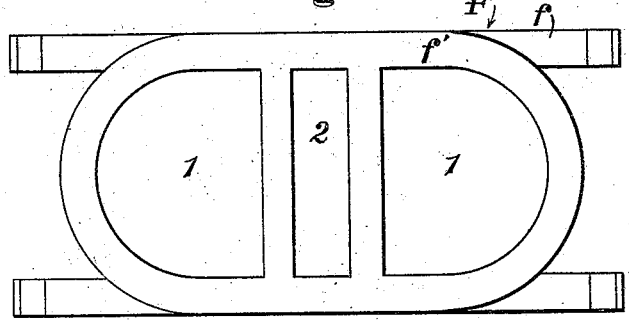
Figure 3:
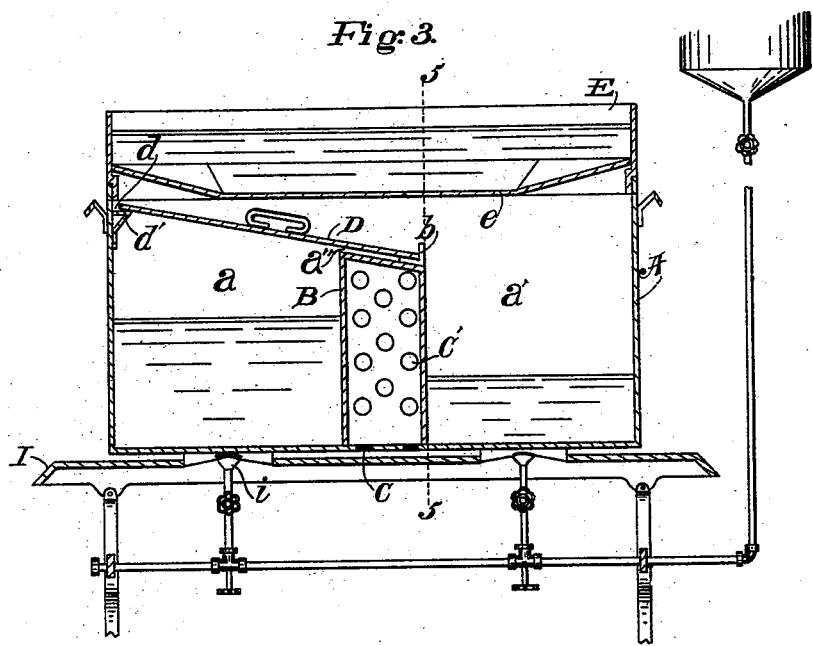
Figure 4:
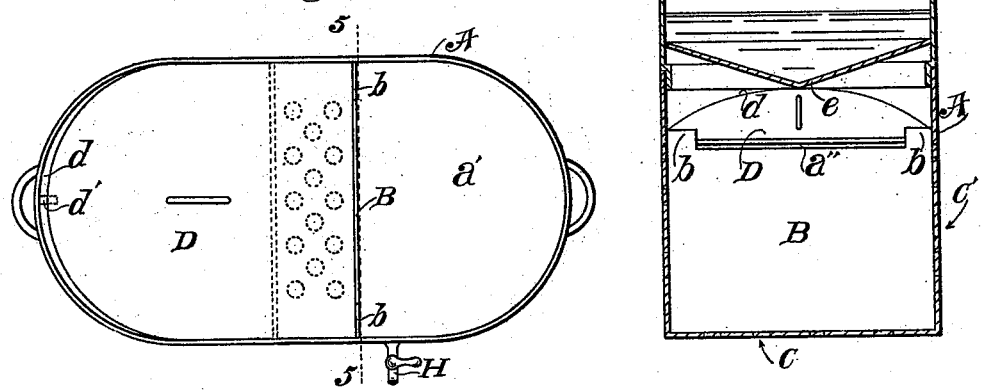
Figure 5:
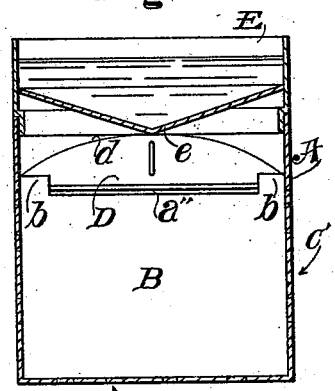

Figure 1 is a vertical longitudinal mid-section of my newly-invented still and cooking appliance and water-heater in operation. Fig. 2 is a plan view of the stand. Fig. 3 shows the still in operation on a gasoline-stove. Fig. 4 is a plan of the main vessel of the still with the drip-pan in position. The condensing-tray is not shown. Fig. 5 is a vertical transverse section of the still on line 5 5, Fig. 3, looking to the left.

My invention embraces a still adapted for distilling water by lamp-heat, and comprises the combination of the main vessel A provided with a transverse hollow partition B ending below the top of the vessel and provided with air inlets and outlets C C' communicating with the hollow interior of the partition, a removable drip-plate D arranged above the partition, with a space $a''$ between to allow passage into $a'$ of drops of condensed steam collected on under surface, and sloping upward therefrom toward the end of the main vessel, and arranged with the space $d$ between its upper edge and the wall of the vessel, the condensing-tray E arranged above the drip-plate and provided with the centrally-depressed bottom $e$, and the skeleton stand F composed of the legs $f$ and the skeleton top $f'$ provided with the side openings 1 and with the central opening 2 and with the downwardly-projecting wings 3, respectively, arranged between the central opening 2 and the side openings, the whole being so arranged that when the main vessel is placed upon the stand the air-inlets C in the hollow partition B will be above the central opening 2, to thus allow the air to flow up through the opening 2 and the inlets C into the hollow interior of the partition and then out through the outlets C', while at the same time the water-chamber $a$ on one side of the partition will be over one of the side openings 1 in the top of the stand, so that the lamp G can be placed beneath the stand under said side opening 1, thus to apply heat to vaporize the water in the reservoir $a$. The water thus vaporized will pass up through the space $d$, and, rising, will come in contact with the bottom $e$ of the condensing-tray or water-tank E.

In practice the condensing-tray E is partially filled with water and the evaporating-reservoir $a$ is also partially or wholly filled with water and the heat is applied. The water which passes up through the space $d$ and comes in contact with the bottom $e$ will be condensed on such bottom and will flow down to the depressed center line of the bottom $e$ and from thence will drip and will fall upon the inclined drip-plate D, down which it will flow to and over the hollow partition and into the condensed-water reservoir $a'$. The downwardly-projecting wing 3 serves to shield the central opening 2 from the heat from the lamp, so that the heated air from the lamp will not pass up through the air-inlets C.

The heated water in the reservoir heats the air in the hollow partition, which then flows out through the air-outlets C' and is replaced by cold air from below, so that the reservoir $a'$ is well insulated from the water in the evaporating-reservoir $a$.

The top of the stand is formed of sheet metal and the wings 3 are stamped out of the same and bent down, thus forming a shield on each side of the central opening 2 in such top, and the opening thus made serves to admit the heat from the lamp to the bottom of the still.

The condensing-tray E and the drip-plate D are both removable, so that water can be poured into the evaporating-chamber $a$ and the vessel can be easily cleaned. The top of the partition B slopes from the evaporating-reservoir $a$ toward the condensed-water reservoir $a'$, and upward projections $b$ are provided at the lower side of the top of the partition to hold the drip-plate D from sliding down over the partition. This upward projection is formed of a bent piece of sheet metal, the lower limb of which is soldered to the top of the partition and holds up the lower end of the drip-plate, thus to allow the condensed water, which flows down the under side of the drip-plate, to flow into reservoir $a'$.

$d'$ is a bracket above the level of the partition for supporting the upper end of the drip-plate. The drip-plate rests upon the bracket and partition and against the upward projections $b$ and is thus held at the proper slope and is prevented by the upward projections $b$ from slipping away from the bracket.

H indicates a faucet for drawing off water from the condensed-water reservoir.

In Fig. 3 I have shown a still or cooker placed upon a gasoline-stove I. In this instance the left-hand burner $i$ will be lighted, thus to evaporate the water from the reservoir $a$.

If desired to use the appliance for cooking purposes, both reservoirs may be used for this purpose and each of the burners may be lighted.

Now, having described my invention, what I claim as new, and desire to secure by Letters Patent, is—

1. The still comprising the main vessel provided with the hollow partition and with the air inlets and outlets communicating with the hollow interior of the partition; the inclined drip-plate arranged above the partition and sloping upward therefrom toward the end of the main vessel and arranged with a space between its upper edge and the wall of the vessel; and the condensing-tray arranged above the drip-plate.

2. The still comprising the main vessel provided with a hollow partition and with air inlets and outlets communicating with the hollow interior of the partition; the inclined drip-plate arranged above the partition and sloping upward therefrom toward the end of the main vessel and arranged with a space between its upper edge and the wall of the vessel; and the condensing-tray arranged above the drip-plate and provided with a centrally-depressed bottom.

3. In a still for distilling water by lamp-heat, the combination of the skeleton stand composed of legs and the skeleton top provided with the side opening, the central opening and the downwardly-projecting wing arranged between the central opening and the side opening; the main vessel provided with a hollow partition and with the air inlets and outlets communicating with the hollow interior of the partition and arranged on the stand with the air-inlets over the central opening; the inclined drip-plate arranged above the partition and sloping upward therefrom toward the end of the main vessel and arranged with a space between its upper edge and the walls of the vessel; and a condensing-tray arranged above the drip-plate.

4. In a still the skeleton stand set forth composed of the legs and the skeleton top provided with the side opening, the central opening, and the downwardly-projecting wing arranged between the central opening and the side opening.

5. The combination of the main vessel; the transverse partition ending below the top of the vessel; the drip-plate arranged above the partition and sloping upward therefrom toward the end of the main vessel and arranged with a space between its upper edge and the walls of the vessel; and the condensing-tray arranged above the drip-plate.

6. In a water-still, the combination of the main vessel; the transverse partition ending below the top of the vessel and provided with an upward projection; the drip-plate bracket fastened to the inside of the vessel above the level of the partition; the drip-plate resting upon such bracket and partition, and against the upward projection of the partition.

WALLACE G. MINOR.

Witnesses:
JAMES R. TOWNSEND,
F. M. TOWNSEND.